United States Patent [19]

Isozumi et al.

[11] Patent Number: 4,978,874

[45] **Date of Patent: * Dec. 18, 1990**

[54] COAXIAL TYPE ENGINE STARTER WITH HOLLOW ARMATURE SHAFT

[75] Inventors: Shuzoо Isozumi; Tetsuo Yagi; Toshinori Tanaka, all of Himeji, Japan

[73] Assignee: Mitsubishi Denki Kabushiki Kaisha, Tokyo, Japan

[ * ] Notice: The portion of the term of this patent subsequent to Aug. 1, 2006 has been disclaimed.

[21] Appl. No.: 249,174

[22] PCT Filed: Oct. 16, 1987

[86] PCT No.: PCT/JP87/00792

§ 371 Date: Aug. 15, 1988

§ 102(e) Date: Aug. 15, 1988

[87] PCT Pub. No.: WO88/02946

PCT Pub. Date: Apr. 21, 1988

[51] Int. Cl.$^5$ .............................................. H02K 7/10

[52] U.S. Cl. ........................................ 310/83; 310/71

[58] Field of Search ....................... 74/7 R; 290/38 R; 310/71, 83, 90, 239

[56] References Cited

U.S. PATENT DOCUMENTS

| | | | |
|---|---|---|---|
| 4,116,077 | 11/1976 | Mazzorana . | |
| 4,128,778 | 12/1978 | Merkle et al. | 310/90 |
| 4,587,861 | 7/1984 | Morishita . | |
| 4,604,907 | 11/1984 | Morishita et al. . | |
| 4,816,712 | 3/1989 | Tanaka | 310/80 |
| 4,838,100 | 6/1989 | Tanaka | 74/7 A |
| 4,852,417 | 8/1989 | Tanaka | 310/83 |
| 4,862,027 | 8/1989 | Isozumi et al. | 310/83 |

FOREIGN PATENT DOCUMENTS

| | | |
|---|---|---|
| 1311876 | 9/1961 | France . |
| 49-13123 | 4/1974 | Japan . |
| 51-43315 | 3/1976 | Japan . |
| 147712 | 12/1977 | Japan . |
| 55-45894 | 10/1980 | Japan . |
| 120782 | 9/1981 | Japan . |
| 57-52773 | 11/1982 | Japan . |

*Primary Examiner*—Steven L. Stephan
*Assistant Examiner*—D. L. Rebsch
*Attorney, Agent, or Firm*—Lowe, Price, LeBlanc, Becker & Shur

[57] ABSTRACT

An engine starter comprising a motor having a tubular armature rotation shaft, a rotation output shaft arranged on one axial end of the motor and on the coaxial line with the armature rotation shaft and axially slidably supported, a clutch mechanism for transmitting the turning force of the armature rotation shaft to the rotation output shaft and an electromagnetic switch which not only has a shifting member, by means of an electromagnetic force, to push the rotation output shaft in the axial direction to slidably move it, but which brings movable contacts in touch with fixed contacts, thereby to supply power to the motor. The rear part of the rotation output shaft and the front part of the shifting member inserted into the armature rotation shaft tube from opposite directions, the shifting member of the electromagnetic switch, armature rotation shaft and the rotation output shaft are coaxial. For making the whole length of the starter compact in coaxially arranging these parts, a composition preventing invasion of dust into the contact chamber of the electromagnetic switch is adapted. For providing such a compact composition, restrictions are made on the position of the spring as a means for restoring the rotation shaft to its former position after the engine has started.

16 Claims, 8 Drawing Sheets

COAXIAL TYPE ENGINE STARTER WITH HOLLOW ARMATURE SHAFT

TECHNICAL FIELD

The present invention relates to improvements in engine starters used in automobiles' engines, etc., and DC motors used in such engine starters, etc..

BACKGROUND ART

An example known of starters of the type having planetary reduction gears built therein is shown in FIG. 1. In this figure, 101 designates an armture, and 102 an armature rotation shaft with a commutator 103 engagingly set thereon at the rear part thereof. To this commutator 103, armature coils 104 are connected.

Numeral 105 designates a brush and holder to be in contact with the commutator 103, which are secured to a rear bracket 107. Numeral 108 designates a bearing, and 109 a yoke of dc motor, which has a plurality of permanent magnets 109a securely set on the internal circumferential surface thereof.

On an end surface of this yoke 109, a front bracket 111 wherein an internal gear 110, which comprises a planetary reduction gear, is engagingly mounted as shown in the figure. With both spur gear 112 and the internal gear 110, a plurality of planetary gears 113 are engaged. Numeral 114 designates a bearing supported by a supporting pin 115 and engagingly set on the internal circumferential surface of the planetary gear 113, and numeral 116 designates a flange for fixedly setting this supporting pin 115, which composes an arm of the planetary reduction gear, with a rotation output shaft 117 fixedly set thereon at the rear. Numeral 118 designates a sleeve bearing, and 119 also a sleeve bearing engagingly fit in the rear inner circumferential cavity of the rotation output shaft 117, which bears the front end part of the afore-mentioned armature rotation shaft 102. Numeral 120 designates a steel ball for giving an taking the thrust force, and 121 a helical·spline formed on the outer circumference of the intermediate part of the rotation output shaft 117, with an overrunning clutch 122 in front and in a rear slidably engaged thereon in spline way. Numeral 123 designates a stopper provided at the front end part of the output shaft 117 for controlling the axial shift of a pinion 124, and 125 a sleeve bearing for bearing the rotation output shaft 117 at its front end part, which is engagingly set on the front end inside surface of the front bracket 111. Numeral 126 designates a lever having a rotation shaft 126a, each end of which is to be engagingly fit on the outer peripheral parts of a plunger 128 of an electromagnetic switch 127 and the overrunning clutch 122, as shown in this figure. Numeral 129 designates a movable contact, which is mounted on a rod 131 through an insulator 130, and the rod 131 is in front and in rear movably inserted in a core 132. Numeral 133 designates a fixed contact which is fixed, by means of a nut 134, to a cap 135 which is of an insulator. Numeral 136 designates an exciting coil for urging the plunger 128, which is wound on a bobbin 137 and contained in a case 138 in that state. Numeral 139 designates a lead wire, which connects the fixed contact 133 with a brush of the brush-and-holder 105.

In the following, the operation of this starter is described. By closing a key switch not shown in this figure, an exciting coil 136 of the electromagnetic switch 127 is energized, whereby the plunger 128 is urged to move rearward, to push the rod 131 rearward, thereby setting the movable contact 129 to abut the fixed contact 133. Thereby, power is supplied to the armature coils 104 from the fixed contacts 133 through lead wires 139 and the brush-and-holder 105, causing the armature 101 to produce its turning force. The rotation of the armature 101 is transmitted from the spur gear 112 to the planetary gear 113 and, then, to the overrunning clutch 122, with the speed reduced by the planetary reduction gear. At this time, the pinion 124 which is engaged with the overrunniing clutch 122 is rotationally driven together with the rotation output shaft 117.

On the other hand, the force of the plunger 28 which has been urged as hereabove described rotates the lever 126 counterclockwise with the rotation shaft 126a as the center of rotation, causing the overrunning clutch 122 to slide forward along the axial line together with the pinion 124. Thereby, the pinion 124 engages with, for example, a ring-gear circumferentially provided on a flywheel mounted on a crank shaft not shown in this figure of an engine, thereby to start the engine.

With the conventional engine starter composed as hereabove described, the electromagnetic switch and the DC motor are parallel-axially composed. Therefore, when the conventional engine starter is mounted on the vehicle, the space for the electromagnetic switch becomes necessary on the vehicle side, exclusive of the engine or the engine section, thus limiting engine design layout in vehicles, etc., and involving other problems.

In order to avert such a problem, it was proposed to provide a starter unit in such a simple form as a mere oblong cylinder, with the electromagnetic switch arranged on one axial end side of the DC motor. According to this proposal, the basic composition is such that the plunger rod of the electromagnetic switch unit or the like push rod is extended to the rotation output shaft through the internal passage of the armature rotation shaft; such type of the starter unit is called a coaxial type starter unit, because the armature rotation shaft of the DC motor and the rod of the electromagnetic switch unit are arranged on a coaxial line.

However, when the coaxial type is adopted as proposed, its whole shape would become a simple oblong cylinder, resulting in that its total length becomes long.

In a coaxial type starter with the electromagnetic switch disposed at the rear of the motor, it is necessary that the armature rotation shaft should be hollowed and the rod of the magnetic switch be inserted into the shaft, to push the rotation output shaft. In such case, however, there is a fear that dust or oil invades through the armature rotation shaft or brush powders invasion is likely; and thus there was a problem because complete sealing of the contact chamber of the electromagnetic switch is impractical.

For this reason, the conventional coaxial type starter is so composed as to have its contacts installed in separate places, thereby resulting in a lengthened dimension of the starter; thus, the problem in engine layout has not been solved.

In the above-described coaxial type starter, a coil spring for restoring the aforementioned rotation output shaft to its former position after the engine has started is necessary, raising a problem that, depending on where this coil spring is installed, the total length of the starter may become too long, and the additional problem that the composition of the stopper for restricting the forward movement of the aforementioned rotation output shaft becomes complex.

Further, to avoid interference of the end edge part of the front bracket with, for example, the flywheel inside the engine transmission mission housing, the configuration of the flywheel is too restricted.

Furthermore, heretofore, DC motors employed in, for example, vehicle starter units, etc., have been composed as shown in FIG. 2. Thus the conventional DC motor is equipped with an armature core 101 mounted on a rotation shaft 102 and a commutator 103 supported on this rotation shaft on one side of said armature core 101. This commutator 103 is a so-called face type, having its contacting surface 103*a* with brushes 105*a* of the brush unit 105 formed as a perpendicular surface crossing at a right angle to the axial line of the rotation shaft 1, and said commutator 103 is composed of a large number of commutator segments 103*b* insulated from each other with a synthetic resin. To each of these segments 103*b*, the terminal part 104*a* of each armature coil drawn out of the armature core 101 is connected. Accordingly, these terminal parts 104*a* are closely arranged around the rotation shaft 102 in its circumferential direction, thereby forming a ringed terminal wire group 104.

On the outer circumference of this ringed terminal wire group 104, a fastening ring 200, called a "bind" is provided for preventing outward projection of said terminal wire group 104 due to the centrifugal force, when it is turned together with the armature core 101 and the commutator 103. This bind 200 is generally formed by winding piano wire 200*a* on the upper surface of an insulating paper 201. In place of the piano wire 200*a*, a ringed iron plate or a tape impregnated with a resin, etc., may be used.

In FIG. 2, 105*b* designates a holder for the brush unit 105 and 202 a mold part for supporting the commutator 103 on the rotation shaft 102 through an inset 203.

When a DC motor is utilized as a vehicle starter, sometimes the revolution of the rotation shaft is transmitted to the overrunning clutch through a reduction gear. In a starter of this construction, sometimes the armature core is reduced in size by raising the reduction ratio of the reduction gear for miniaturization and reduction in weight of the DC motor. In this case also, the commutator size is physically determined, so that it cannot be reduced in size in correspondence with the armature core. Accordingly, the commutator becomes relatively larger than the armature core, and when the armature core is reduced at size, its revolution will be in a higher speed. On this account, a very large centrifugal force is imposed on the commutator.

In its normal use, not limited to its utilization for vehicle starters, the commutator, particularly, segments are made larger than the armature core for improving the rectifying condition. When the commutator is made large, brush sweep area is increased and current density is reduced, whereby the rectifying condition is improved and the brushes' service life is prolonged. In such a state also, the commutator will receive a larger force from the centrifugal force, since the commutator becomes relatively larger than the armature core.

Further, in whichever case described hereabove, when the commutator is of the so-called face type in which its contacting surface with brushes is formed in a perpendicular surface which crosses with right angles to the axial line of the rotation shaft, the size of the commutator increases in the radial direction, resulting in larger centrifugal forces. The centrifugal force exerted on the commutator may become larger enough to break the connection of the commutator's segments with an insulator causing segments to burst radially Accordingly, it is an object of this invention, to solve such conventional problems, and to provide a small engine starter by retrenching its whole length as much as possible.

It is another object to obtain a starter wherein contacts are not soiled by the brush powders from the motor part or by the dust infiltrating through the hollow shaft of the armature.

Further, it is also another object to offer a coaxial type starter which permits simplification of its composition by providing a coil spring for restoring the pinion backward or a stopper for restricting its forward movement, and further can achieve coaxial and compact design as well.

Furthermore, it is still another object to provide a DC motor which can deter segments from bursting out even under a large force applied on the commutator due to the centrifugal force.

DISCLOSURE OF THE INVENTION

The engine starter of this invention is an engine starter comprising a motor having a tubular armature rotation shaft, a rotation output shaft disposed on one end side of the aforementioned motor and on the axis of the shaft, with regard to axial direction, the aforementioned armature rotation shaft and supported slidably in its axial direction, a clutch mechanism for transmitting the turning force of the aforementioned armature rotation shaft to the aforementioned rotation output shaft and an electromagnetic switch installed on the other end side of the aforementioned motor with regard to axial direction, which has a shifting member, by means of an electromagnetic force, making the aforementioned rotation output shaft to push and slide in its axial direction, but also by the aforementioned electromagnetic force brings movable contacts in touch with fixed contacts, thereby supplying power to the aforementioned motor, with the rear part of the aforementioned rotation output shaft and the front part of the aforementioned shifting member inserted into the tube of the aforementioned armature rotation shaft from mutually opposite directions; and this invention is to provide a coaxial type and compact engine starter by adopting a composition effective for prevention of invasion of dust especially between the motor and the electromagnetic switch.

By restricting the disposing position of the spring which is provided for returning the output shaft to its former position after the engine has starter, more compact design has been attained.

Further, where the composition for holding the brushes for supplying power to the motor is concerned, by adopting fitting the brush holders in a bracket, more compact design has been achieved.

Furthermore, for structural reinforcement in the process of more compact designing, attention has been paid particularly to the compact fitting of the commutator and the armature coils of a dc motor used in an engine starter, etc.; thus, for the purpose of integrally mounting the armatrue coil terminal parts and the commutator on the rotation shaft, a bind is outfitted on the armature coil terminal parts and the commutator's boss shape parts, straddling thereover, so that a highly reliable dc motor may be obtained.

BEST MODE FOR CARRYING OUT THE INVENTION

Figure 1:
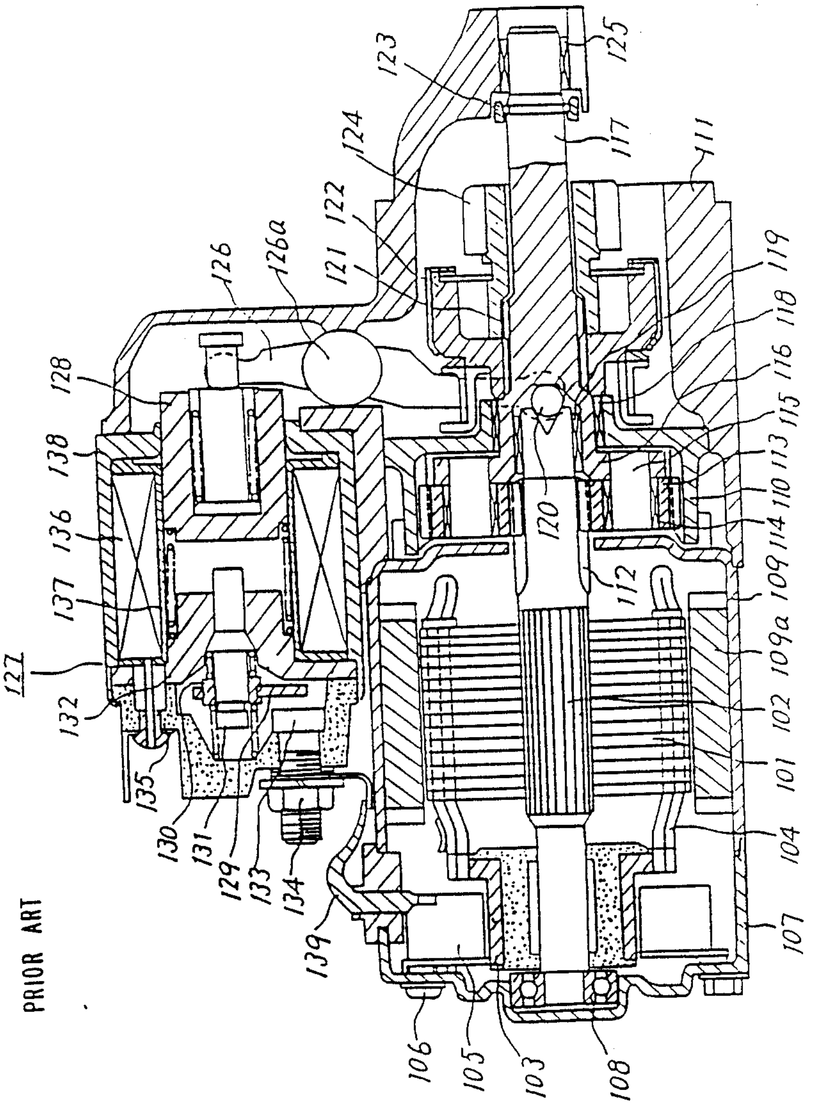
FIG.1 PRIOR ART
FIG. 1 is a sectional view of the conventional engine starter.
Figure 2:
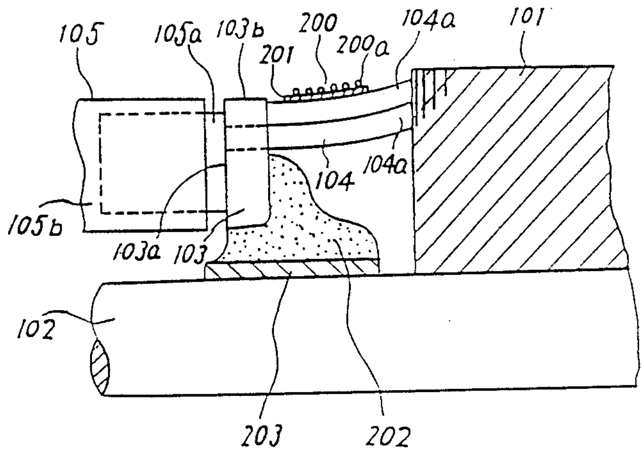
FIG. 2 PRIOR ART
FIG. 2 is a sectional view partially showing the conventional dc motor.
Figure 3:
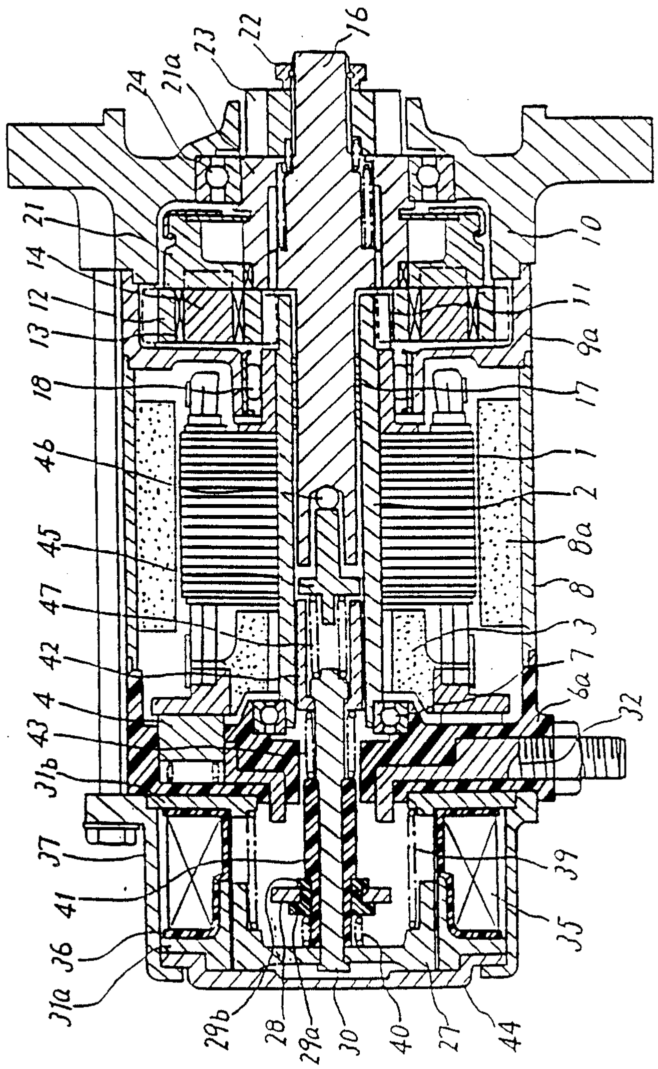
FIG. 3 is a sectional view of an engine starter in accordance with an embodiment of this invention.

The present invention will become more apparent from the description taken hereunder in conjunction with the accompanying drawings:

FIG. 3 is a sectional structural view of a coaxial type starter in accordance with an embodiment of this invention, which includes armature 1 of a dc motor, armature rotation shaft 2, and face type commutator 3 engagingly set rearward of the armature. *6a* designates a bracket molded of an insulator resin, wherein brushes 4 are inserted. Numeral 7 designates a bearing which supports the armature rotation shaft 6 and engagingly fits with a resin bracket *6a*, as shown in the figure; fixed contact 32 is integrally molded with the resin bracket *6a*.

Numeral 28 designates a movable contact, which is mounted on a bush 41 through insulators *29a* and *29b*. Numeral 40 designates a spring for urging the movable contact, and its force is received by a plunger 27 which supports the rod 30. The bushing 41, placed outside the rod 30, receives at one end face the force of the spring 43. Spring 43 presses against sleeve 42 which urges the rotation output shaft 16 forward. There is a minute clearance between the bushing 41 and the internal circumferential surface of the forementioned resin bracket *6a*; exciting coil 35 urges the plunger 27, wound on a bobbin 36 made of a resin. Iron cores *31a* and *31b*, which, together with a case 37 and the plunger 27, form a magnetic path; nonmagnetic plate 44 is securely held between the case 37 and the iron core *31a*. Numeral 39 designates a spring for restoring the plunger 27; this spring is made of stainless steel and is inserted between the plunger 27 and the iron core *31b*. Numeral 45 designates a second rod, which is aligned with the rotation output shaft 16 through a steel ball 46, and 47 a spring which thrusts the steel ball to the rotation output shaft; permanent magnet *8a* produces a magnetic field, through yoke 8 of the dc motor, on an end surface whereof there is outfitted a bracket *9a* which creates an internal gear with which the planetary reduction gear is engaged.

At the front end part of the armature rotation shaft 2, a spur gear 11 is formed, and with this gear a planetary gear 12 is engaged. Numeral 13 designates a bearing engagingly set in the internal circumferential surface of the planetary gear, which is supported by a supporting pin 14, and this supporting pin 14 is securely set on the rear of an overrunning clutch 21; bearing 24 is engagingly set in an overrunning clutch inner tube *21a*, to support radial load, which is engagingly fit in a cavity of the front bracket 10. Numeral 16 designates the rotation output shaft which is in front and in rear slidably engaged with a helical spline formed on the inner surface of the overrunning clutch inner tube *21a*; sleeve bearing 17 supports the rear end of the rotation output shaft 16 and is engagingly set on the inner surface of the armature rotation shaft. Numeral 18 designates a bearing for supporting the front end part of the armature rotation shaft, which is engagingly set in the cavity of the bracket *9a* provided with an internal gear, as shown in this figure.

Pinion 23 which is engagingly fit with a straight spline formed on the outer circumference of the front end of the rotation output shaft 16; stopper 22, maintains the pinion 23 on the rotation output shaft 16.

Figure 4:
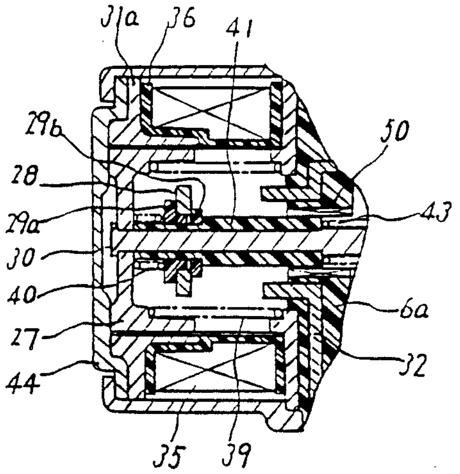
FIGS. 4–11 are respectively composition diagrams for particularly showing composition parts of an engine starter in accordance with an embodiment of this invention.
Figure 5:
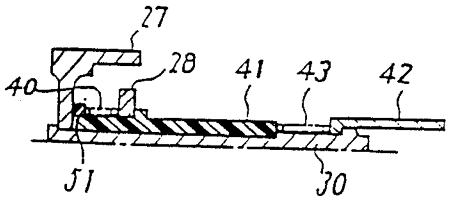

FIG. 4 shows an embodiment having a sleeve bearing 50 engagingly set on the inside surface of the resin bracket *6a*. FIG. 5 shows an embodiment wherein the bushing 41 is manufactured of a resin and which shows the movable contact 28 and the spring 40 installed with an insulating plate 51 placed between the aforementioned bushing and plunger.

In the following, the operation is described. By closing a key switch not shown in this figure, the exciting coil 35 is energized, whereby the plunger 27 is urged and the movable contact 28 begins to move forward. Forward-moving force of the rod 30 is transmitted to the rotation output shaft via the sleeve 42, the second rod 45 and the steel ball 46; and after contacting of an end surface of the pinion 23 with an end surface of the ring gear not shown in the figure, the rod 30 further moves forward, and the spring 43 is made compress, and at the same time the movable contact 28 contacts with the fixed contact 32 to energized the motor via the brushes 4, thereby to start the motor. By force of compressed spring 43, the pinion 23 is pushed, and the pinion 23 begins to engage with a ring gear not shown in the figure. Since the bushing 41 is constructed so that there exists a minute clearance between itself and the resin rear bracket *6a*, it becomes possible to prevent infiltration of the brush powders from a commutator surface and the dust from the hollow of the armature, to prevent the contact from getting soiled by them.

As hereabove described, according to this invention, the coaxial type starter is equipped with a mechanism for urging the rotation output shaft, having the pinion, by the rod of the electromagnetic switch and a mechanism for engaging a movable contact; therefore, it is possible to prevent soiling of contacts by the brush powders from the commutator surface and by dust coming through the armature rotating hollow shaft, and thereby a small sized and coaxial type starter can be realized.

While the above embodiment describes a means for preventing invasion of dust, another embodiment for preventing invasion of dust will be described hereunder.

In this embodiment, an oil seal is set by fitting on the internal circumferential surface of each brush holder provided with fixed contact of an electromagnetic switch, or on the internal circumferential surface of the rear bracket and the rod of the electromagnetic switch is slidably arranged on the oil seals.

This embodiment will now be described in conjunction with an accompanying drawing. In this figure, no particular definition is given to parts which have already been mentioned with reference to FIG. 3.

Figure 6:
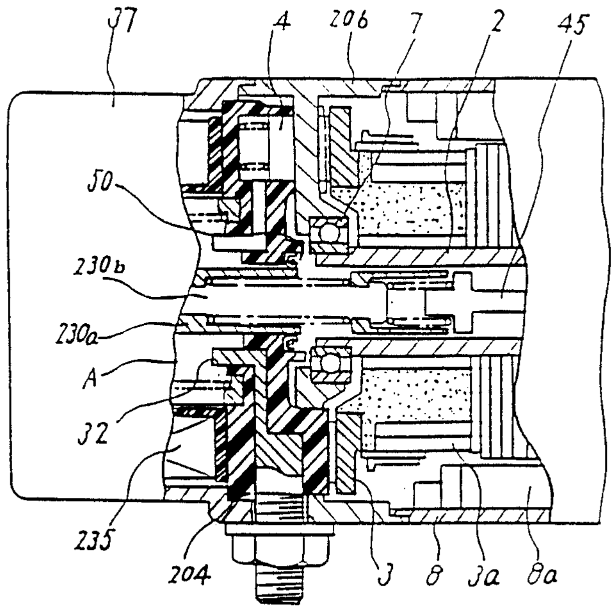

FIG. 6 is a partial sectional view of an engine starter as a second embodiment of this invention. In this figure, numeral 50 designates the oil seal fit on the internal circumferential surfaces of the brush holder 204, which hermetically close the electromagnetic switch's contact chamber A by making sliding contact with the plunger rod 230a.

That is, when a key switch not shown in this figure is turned on, an exciting coil 235 of the electromagnetic switch is energized; as a result, the plunger is urged to move forward together with the rod 230b. Thereby, the outer circumferential surface of the plunger rod 230a mounted on the rod 230b is brought into a sliding contact with the oil seal 50, causing the movable contact to be in touch with the fixed contact 32; accordingly, the brushes 4 connected to the fixed contact 32 by lead wires are energized, so that the armature coils 3a are electrified through a commutator 3, to set the armature operation.

Figure 7:
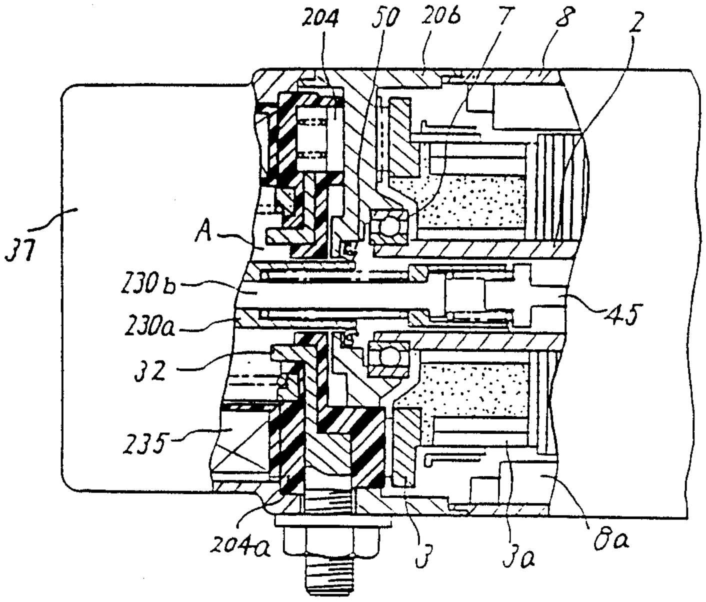

While in the aforementioned embodiment the oil seal 50 is mounted on the brush holder 204, as shown in FIG. 7 the oil seal 50 may be engagingly set on the inner circumferential surface of the rear bracket 206 made of a conductive member or a resin whereon a bearing 7 disposed between a yoke 8 and the electromagnetic switch supports the rear end of the armature rotation shaft 2; and the plunger rod 230a may be brought into a sliding contact with this oil seal 50. In that way, the contact chamber A of the electromagnetic switch can be hermetically closed similarly as in FIG. 6.

Figure 8:
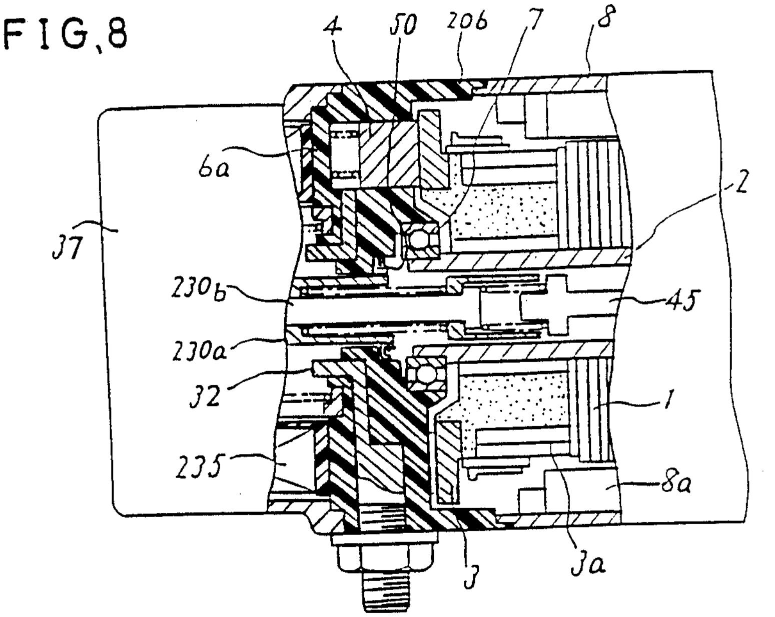

As shown in FIG. 8, if the rear bracket 206 and the brush holder 204 are integrally formed of a resin, the number of parts will be reduced for the benefit of reduced cost in manufacture.

According to the embodiments shown in FIGS. 6–8, the oil seal is provided on the inner circumferential surfaces of the brush holders provided with the electromagnetic switch's fixed contact or on the inner circumferential surface of rear bracket on which the bearing for supporting the armature rotation shaft is mounted, and on these oil seals, the electromagnetic switch's rod is brought into sliding contact, whereby the electromagnetic switch's contact chamber is hermetically closed, to avert invasion into the contact chamber of dust or oil or abraded brush powders, enabling realization of a coaxial type starter which is of high quality, small sized and reduced weight.

In the following, a composition for restoring the rotation output shaft to its former position after engine starting is described.

That is, in this composition, the helical spline placed on the inner circumferential surface of the overrunning clutch inner tube is provided with its forward abutting end part, and between the front end stepped part provided on the overrunning clutch inner tube and the stepped part of the rotation output shaft which engagingly fits with the helical spline, a coil spring is installed so as to be positioned inside the helical spline.

With this composition, the front abutting end part of the helical spline restricts the forward movement of the rotation output shaft, and by the restoring force of the coil spring, the rotation output shaft is moved rearward to its former position.

Figure 9:
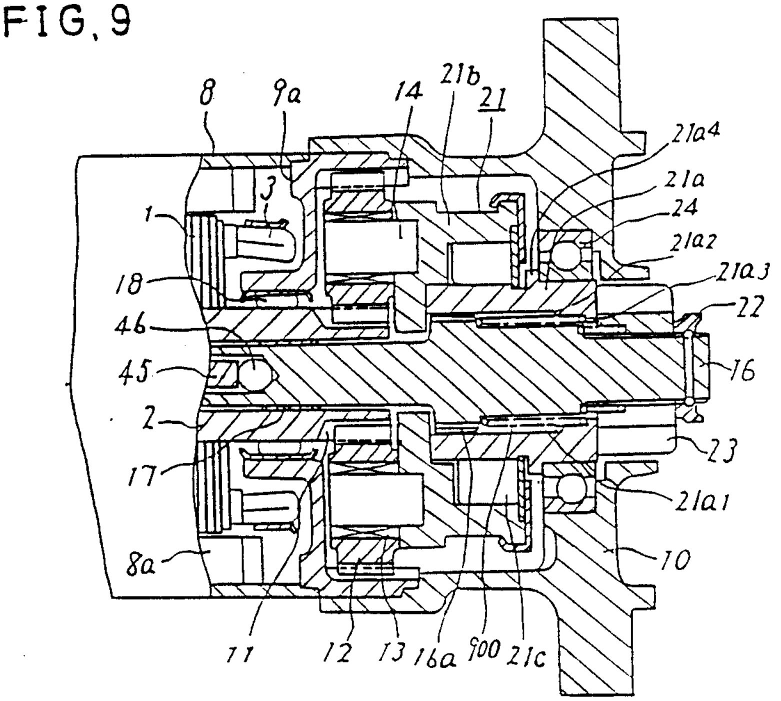

Referring to FIG. 9, 21a designates the overrunning clutch inner tube, 21b an overrunning clutch outer tube, and 21c a roller arranged between them, the overrunning clutch 21 being composed of the aforementioned composing elements marked by 21a–21c. Mark 21$a_1$ designates a helical spline formed by cold forging on the inner circumferential surface of the overrunning clutch inner tube 21a, which is engagingly fit in the spline with the rotation output shaft 16 for in front and in rear sliding of the rotation shaft 16. With its forward abutting end part 21$a_2$ provided, the forward movement of the rotation output shaft 16 is restricted. Inside the aforementioned helical spline 21$a_1$ and between the stepped part 21$a_3$ at the front end of the overrunning clutch inner tube 21a formed inward thereof and the stepped part 16a of the output rotation shaft 16, there is installed a coil spring 900 for returning rearward the rotation output shaft 16. Numeral 24 designates a bearing for supporting radial load, which is engagingly set to be abutted at its rear part on the stepped part 21$a_4$ formed on the outer circumference of the clutch inner 21a and which is engagingly fit in the cavity of the front bracket 10.

In the following, the operation of this starter is described. When the armature coils 3 are energized and the armature 1 produces a turning force, the rotation of the armature 1 is translated into revolution of the planetary gear 12 through a spur gear 11, which is reduced in speed by this planetary reduction mechanism and transmitted to the overrunning clutch 21, to be transmitted to the rotation output shaft 16 which is engagingly fit in spline way with the herical spline 21$a_1$ provided on the overrunning clutch inner tube 21a.

On the other hand, the force of the plunger of the electromagnetic switch urged by the energization is transmitted to the rotation output shaft 16 through the rod 45 and the steel ball 46 placed inside the hollow shaft of the armature rotation shaft 2. The rotation output shaft 16 which has received the forward thrusting force continues until it abuts on the forward abutting end part 21$a_2$ of the helical spline 21$a_1$ created on the overrunning clutch inner tube 21a, compressing the coil spring 900 installed inside the herical spline 21$a_1$ provided on the inner circumferential surface of the overrunning clutch inner tube 21a. Thereby, the pinion 23 engagingly fit with the rotation output shaft 16 moves forward, to engage with the ring gear not shown in this figure. Engagement with the ring gear will start the engine.

When the aforementioned key-switch is opened, deenergization of the electromagnetic switch causes rearward movement of the plunger of electromagnetic switch, and the recovering force of the coil spring 900 pushes the rational shaft 16 rearwardly to restore its former position shown in the figure.

As hereabove described, according to this composition, on the helical spline provided on the inner circumferential surface of the clutch inner tube the forward abutting end part is provided, and coil spring is placed inside the helical spline between the inner stepped part and the rotation output shaft stepped part; therefore, it is effective in enabling a unit to be constructed composed simply and at low cost and amenable to miniaturization and reduction in weight.

In the following, the composition of the bracket and the brush holder are described:

In an engine starter described as an embodiment of this invention, supporting holes are provided in the bracket which supports the bearing of the hollow armature rotation shaft. The brush holder for holding the brushes which abut on the commutator is engagingly set in the aforementioned holding holes, and the electromagnetic switch is disposed at the rear part of the brush holder.

Figure 10:
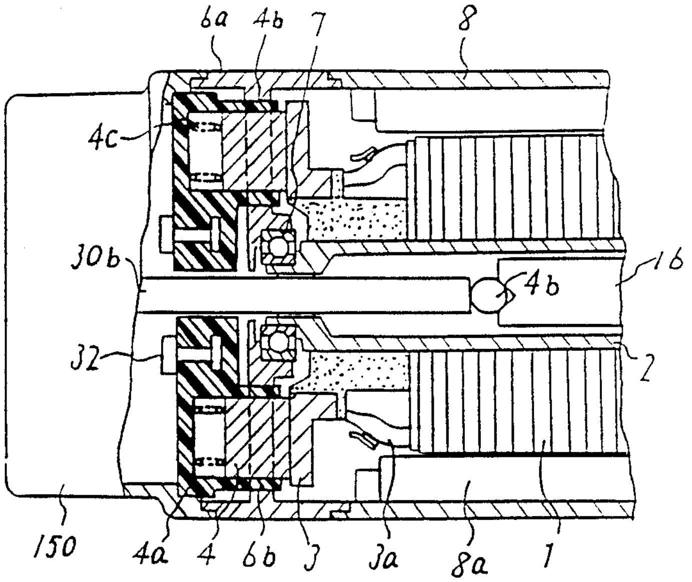
Figure 11:
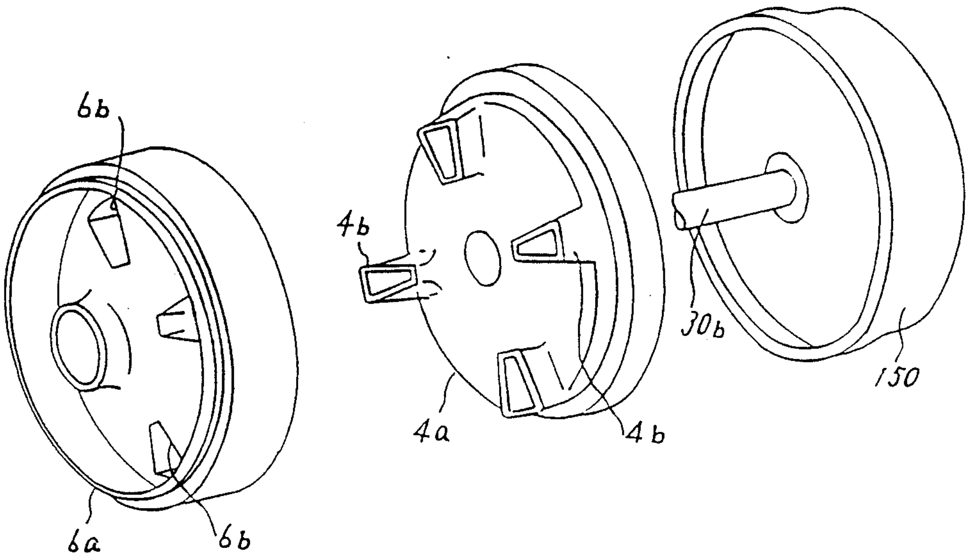

FIG. 10 is a sectional view of the essential part of the composition of the bracket and the brush holder; in this figure, numeral 4 designates a brush, which is inserted in the brush housing 4b of the brush holder 4a made of a resin, with a spring 4c thereon. 6a designates a rear bracket, in the bottom part whereof a plurality of supporting holes 6b are bored as shown in FIG. 11, to permit insertion of the brush holder 4a; from the rear of this rear bracket 6a, the brush housings 4b of the brush holder 4a are inserted. Numeral 7 designates a bearing for supporting the armature rotation shaft 2, which is supported by the rear bracket 6a. Numeral 32 designates fixed contacts fitted on the bottom of the brush holder 4a, and 150 an electromagnetic switch, which effects pressing of the rod 30b of the plunger to the rotation output shaft 16 through a ball 4b and which is disposed at a rear position of the rear bracket 6a.

Adopting such a composition permits brush housings of the brush holders to be inserted into the supporting holes of the rear bracket and then, the electromagnetic switch arranged at a rear position of the brush holders; thus, coaxial disposition of the electromagnetic switch and the motor, as well as light weight and compact composition, is achieved.

In the following, the fastening structure of the armature coil terminal parts of a DC motor is described.

That is, in the engine starter as an embodiment of this invention, the armature coil's terminal parts and segments (commutator segments) are fixed by fastening with a ring shape bind straddling thereover.

Further, a commutator having an outside diameter larger than the diameter of the armature core is used, with a bind outfitted straddling over the boss shape parts of the commutator and the aforementioned terminal parts, and the bind having an internal diameter larger than the diameter of the armature core is used.

Figure 12:
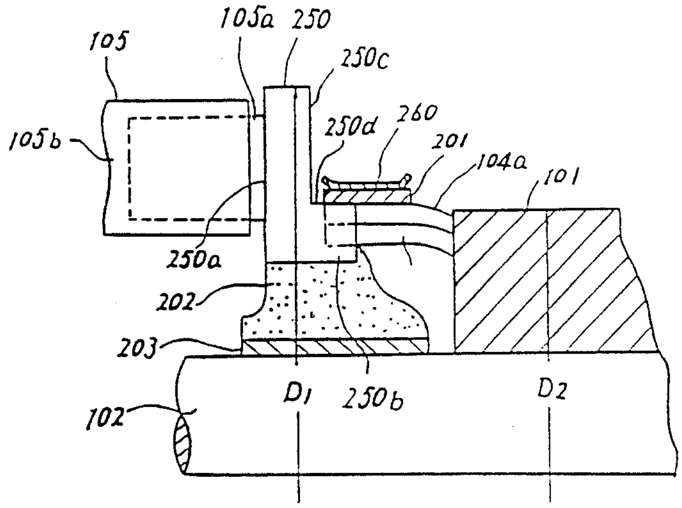
FIG. 12 is a sectional view partially showing a DC motor in accordance with an embodiment of this invention.

FIG. 12 shows fastening structure of the aforementioned armature coil terminal parts; the motor shown is provided with a face type commutator 250, wherein its diameter $D_1$ is made larger than the diameter $D_2$ of the armature core 101. In this commutator 250, a boss shape part 250b extending to the side of armature core 101 along the axial direction is formed at its part in contact with the mold part 201 which supports it, with its outside diameter made nearly equal to or larger than the diameter of the armature core 101. This commutator 250 is composed of L shape segments 250c arranged at equal intervals in its circumferential direction, with each interposing spaces filled with a resin for mutual insulation among segments.

To each segment 250c in such a commutator 250, the terminal part 104a of the armature coil is connected through the boss shape part 250b of said commutator 250. For this reason, the outside diameter of the ringed terminal wire group 104 composed of a large number of terminal parts 104a becomes equal to or larger than the diameter $D_2$ of the armature core 101. A bind 260 is outfitted straddling over both the boss shape part 250b of the commutator 250 and the terminal wire group 104 in the present state comprised of terminal parts 104a. This bind 260 is composed of a ring shaped iron sheet and is outfitted by way of insertion from the side of armature core 101 on an insulating paper 201 having a width thereof to straddle over the boss shape parts 250b of the commutator 250 and the terminal wire group 104, after the insulation paper 201 has been wound thereon. Since the boss shape parts 250b and the terminal wire group 104 have diameters nearly equal to or larger than that of the armature core, the internal diameter of the bind 260 outfitted thereover is, of course, nearly equal to or larger than the diameter of the armature core 101; therefore, it may be introduced from said armature core 101 side by passing over said core 101. Then the bind 260 clamps the respective segments 250c of the commutator 250 and the terminal parts 104a radially inward.

As the most preferable example of the bind 260, ring shaped iron sheet has been shown; but it may be formed by windings of piano wire or a tape impregnated with a resin, besides the iron sheet.

By means of such a composition, even when the commutator 250 receives a large centrifugal force, as it rotates at a high speed or when a large centrifugal force is applied thereon with increased diameter of the commutator 250; and coming apart due to the centrifugal force of all segments 250c of the commutator 250 is prevented, since they are pressed down by the bind 260 at their boss shape part 250b.

Further, since on the side surface of the commutator there are formed boss shape parts with the outside diameter nearly equal or larger than the diameter of the armature core, and the terminal parts of the armature coils are connected to respective segments through said boss shape parts, a bind having the internal diameter larger than the diameter of the armature core may be employed; as a result, even if the bind is formed of a ringed plate member, it may be outfitted by inserting it from the armature core side. Accordingly, the bind attaching operation is greatly improved and the bind will not be broken apart by the centrifugal force.

We claim:

1. An engine starter comprising: a motor having a tubular armature rotation shaft; a rotation output shaft coaxial with said armature rotation shaft at one end of said motor and held to be slidable in the axial direction; a clutch mechanism for transmitting the turning force of said armature rotation shaft to said rotation output shaft; and an electromagnetic switch installed on an axially opposite end of said motor, said switch having a shifting member for slidably moving said rotation output shaft in said axial direction and for engaging a movable contact with a fixed contact by means of said electromagnetic force, thereby to supply power to said motor; wherein a rear part of said rotation output shaft and a front part of said shifting member are positioned within said tubular armature rotation shaft; said shifting member comprising, a sleeve for pushing said rotation output shaft, a spring for pressing said sleeve, a bushing which receives reaction of said spring and said movable contact; wherein a minute clearance is provided between an outer circumference of said bushing and an internal circumferential surface of an insulator on which said fixed contact is disposed.

2. An engine starter according to claim 1 wherein a sleeve bearing is engagingly set on said inner circumferential surface of said insulator on which said fixed contact is disposed, with a minute clearance provided between said inner circumferential surface of said sleeve bearing and an outer circumferential surface of said bush.

3. An engine starter according to claim 1 wherein said bushing is molded of a resin and between said bushing and an end surface of said shifting member, said movable contact, a spring and an insulating washer are provided.

4. An engine starter comprising: a motor having a tubular armature rotation shaft; a rotation output shaft coaxial with said armature rotation shaft at one end of said motor and held to be slidable in the axial direction;

a clutch mechanism for transmitting the turning force of said armature rotation shaft to said rotation output shaft; and an electromagnetic switch installed on an axially opposite end of said motor, said switch having a shifting member for slidably moving said rotation output shaft in said axial direction and for engaging a movable contact with a fixed contact by means of said electromagnetic force, thereby to supply power to said motor; wherein a rear part of said rotation output shaft and a front part of said shifting member are positioned within said tubular armature rotation shaft; a brush holder unit located between said motor and said electromagnetic switch; wherein an oil seal is engagingly set on an inner circumferential surface of said brush holder unit, thereby permitting said shifting member of said electromagnetic switch to slidingly and sealingly move in touch with an inner surface of said oil seal.

5. An engine starter according to claim 4 wherein said brush holder unit is made of a resin.

6. An engine starter according to claim 4 wherein said brush holder unit is molded together with said fixed contacts of said electromagnetic switch.

7. A coaxial type engine starter comprising: a dc motor; a rotation output shaft; an electromagnetic switch including a core and an overrunning clutch; said switch positioned at a rearward axial end of said motor; said clutch positioned at a forward axial end of said motor; said motor comprising a yoke, an armature rotation shaft and a bearing for supporting a rear end of said armature rotation shaft; wherein a rear bracket is positioned between said yoke and said electromagnetic switch and an oil seal is engagingly set on an inner circumferential surface of said rear bracket, thereby permitting said core of said electromagnetic switch to slidingly and sealingly move in touch with an inner surface of said oil seal.

8. An engine starter according to claim 7 wherein said rear bracket is of a resin molded integrally with a brush holder unit.

9. An engine starter according to claim 7 wherein said rear bracket is of a resin.

10. An engine starter according to claim 7 wherein said rear bracket is of a resin molded integrally with a brush holder unit and whereon fixed contacts of said electromagnetic switch are mounted.

11. A coaxial type starter comprising: a motor; an electromagnetic switch positioned axially rearward of said motor for generating a thrusting force when excited; a rotation output shaft positioned axially forward of said motor; said output shaft including a pinion for starting an engine, in response to said thrusting force; an overrunning clutch for transmitting turning force of said motor to said rotation output shaft; said clutch including a helical spline formed by cold forging on an inner circumferential surface of an inner part, said rotation output shaft being engagingly fit with, said spline having a forward abutting end part, a coil spring installed between a stepped portion provided inward of said helical spline at a front end of said inner part and a stepped portion of said rotation output shaft, said coil spring located on the inside of said helical spline.

12. An engine starter according to claim 11 wherein a bearing is engagingly fit on an outer circumference of said inner part and a stepped part to be in contact with a rear part of this bearing is created on said outer circumference of said inner part.

13. An engine starter according to claim 11 wherein a planetary reduction gear unit is provided between said motor and said overrunning clutch.

14. An engine starter comprising a DC motor including an armature and a hollow armature rotation shaft, a commutator disposed at a rear portion of said armature, a rear bracket for supporting a bearing of said hollow armature rotation shaft, said rear bracket including a plurality of supporting holes for insertion of brush holders for holding brushes which are to be in contact with said commutator and an electromagnetic switch disposed at the rear of said brush holders.

15. An engine starter according to claim 14 wherein said brush holder is made of a resin and a fixed contact of said electromagnetic switch is placed on a back surface of said brush holder.

16. An engine starter according to claim 14 wherein said commutator is face type commutator.

* * * * *